May 5, 1936.  J. E. PADGETT  2,040,063
DIRECT ACTION SHOCK ABSORBER
Filed Oct. 17, 1932  2 Sheets-Sheet 2

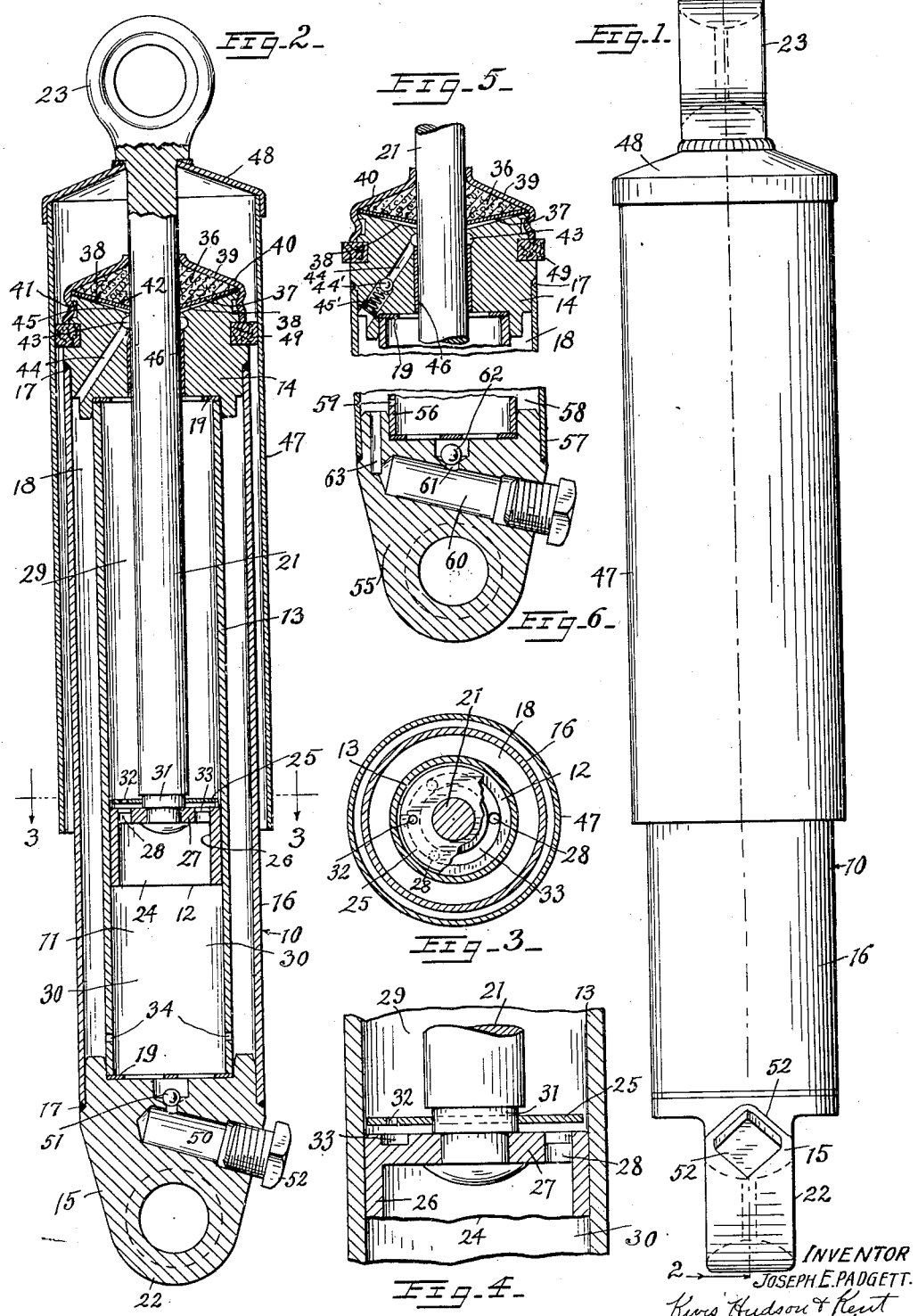

INVENTOR:
JOSEPH E. PADGETT
Kwis Hudson & Kent
ATTORNEYS

Patented May 5, 1936

2,040,063

UNITED STATES PATENT OFFICE 2,040,063

DIRECT ACTION SHOCK ABSORBER

Joseph E. Padgett, Toledo, Ohio, assignor, by mesne assignments to General Motors Corporation, Detroit, Mich., a corporation of Delaware Application October 17, 1932, Serial No. 638,058

14 Claims. (Cl. 188—88)

This invention relates to shock absorbing devices and more particularly to an improved shock absorber of the hydraulic type.

As one of its objects, my invention aims to provide a shock absorber of the hydraulic type embodying novel means for controlling the displacement of the liquid such that a substantially constant shock absorbing action is obtained regardless of change in viscosity of the liquid.

Another object of my invention is to provide a shock absorber, of the type referred to, wherein the displacement of liquid is controlled by the use of an orifice of such form that very little frictional resistance is offered to the passage of liquid therethrough.

A further object of my invention is to provide a shock absorber of the hydraulic type having a piston actuating rod and embodying novel sealing means for preventing leakage around the piston rod.

Still another object of my invention is to provide a shock absorber, of the type referred to, having a novel shield for the piston actuating rod.

It is also an object of my invention to provide a shock absorber, of the direct acting hydraulic type, having a working cylinder and a reservoir, and which embodies novel liquid filling means.

The invention may be further briefly summarized as consisting in certain novel combinations and arrangements of parts hereinafter described and particularly set out in the appended claims.

The subject matter herein disclosed but not claimed, wherein a shock absorbing action substantially independent of viscosity changes, is obtained by the use of a flow-controlling orifice, is claimed in my copending application Serial No. 659,419, filed March 2, 1933.

In the accompanying sheet of drawings,

Fig. 1 is an outside elevational view of a shock absorber embodying my invention;

Fig. 2 is a longitudinal sectional view of the device taken on line 2—2 of Fig. 1;

Fig. 3 is a transverse sectional view taken on line 3—3 of Fig. 2;

Fig. 4 is a detail view on an enlarged scale showing the flow control means;

Fig. 5 is a partial sectional view of another shock absorber embodying my invention;

Fig. 6 is a partial sectional view of yet another shock absorber of my invention;

Figure 7:
Fig. 7 is an elevational view, with parts broken away, showing an overflow opening for the reservoir.
Figure 9:
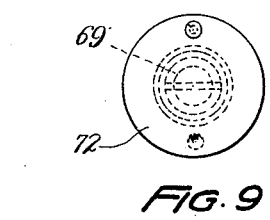
Fig. 9 is a detail elevational view.
Figure 10:
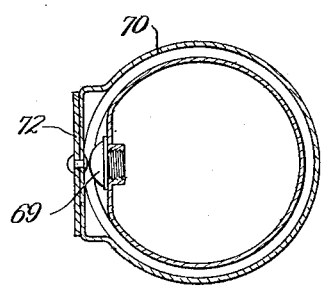
Fig. 10 is a transverse sectional view taken on line 10—10 of Fig. 8.

Detailed reference will now be made to the accompanying drawings, illustrating a preferred form of my direct acting hydraulic shock absorber, which device is an improvement over the shock absorber disclosed in copending application Serial No. 575,267, filed November 16, 1931. Before proceeding with such detailed description it should be understood, however, that my invention is not to be regarded as limited to the particular arrangement of structure illustrated and described, but may be embodied in various other forms of devices.

My improved shock absorber, as shown in the drawings, comprises, in general, a housing 10 having an elongated working cylinder 11 therein, and a piston 12 which is reciprocably operable in the cylinder.

The working cylinder may be of any suitable construction but is preferably in the form of an elongated sleeve or barrel 13 which is closed at its ends by the plug members 14 and 15. The sleeve 13 and the plug members 14 and 15 are retained in assembled relation by means of an outer sleeve or barrel 16, which is disposed in substantially coaxial relation with the cylinder sleeve and has its ends secured to the plug members 14 and 15, preferably by the welds indicated at 17. As shown in the drawings, the diameter of the outer sleeve 16 exceeds the diameter of the cylinder sleeve 13 by a sufficient amount to provide a reservoir 18 between these sleeves, the purpose of which reservoir will appear hereinafter. The sleeves are preferably so proportioned as to length that in assembling the plug members 14 and 15 in the ends of the sleeve 16, the ends of the cylinder sleeve 13 may be pressed against suitable gaskets 19 to prevent leakage around the ends of this sleeve.

To provide for relative movement between the cylinder 13 and the piston 12 which is operably mounted therein, I employ a suitable piston rod 21 which extends into the cylinder through the plug member 14 and is operably connected with the piston. For conveniently applying my shock absorber to a motor vehicle, or such other machines to which the shock absorber is to be applied, I provide the plug member 15 with a suitable connecting portion, preferably in the form of an eye 22, which may be anchored to an available portion of the vehicle, such as one of the axles, and also provide the outer end of the piston rod 21 with a connecting portion, preferably in the form of an eye 23, which may be attached to another portion of the vehicle such as the chassis frame.

The piston 12 may be of any suitable form but is here shown as comprising a cup-shaped member 24 and a valve element 25 which is movable relative to the cup-shaped member. The cup-shaped member may be of metal and is preferably constructed with a skirt portion 26, which is slidably fitted in the cylinder sleeve 13, and with a transverse wall portion 27 to which the inner end of the piston rod is suitably connected. This transverse wall portion is provided with a plurality of spaced openings 28 for connecting the chambers 29 and 30, which are located above and below the piston, and into which the cylinder 11 is divided by the piston. The piston rod 21 is formed with a reduced portion 31, adjacent the transverse wall 27 of the piston, for mounting the valve element 25 so that this element is movable toward and away from the transverse wall for controlling the flow of liquid through the openings 28. The valve element is provided with an orifice 32 of small cross-sectional area as compared with the area of the openings 28 for restricting the flow of liquid through the piston as the latter is moved upwardly in the cylinder. To provide for a free flow of liquid from the openings 28 to the orifice 32 while the valve element is held against the surface of the transverse wall 27, I form an annular groove or recess 33 in this transverse wall which connects the openings 28, and with which groove the orifice 32 registers when the valve element is in engagement with the piston.

During use of my improved shock absorber the cylinder 11 and the reservoir 18 are charged with a suitable liquid, such as an oil and, from the arrangement of parts as described, it will be seen that as the piston moves upwardly in the cylinder there is a tendency to compress the liquid in the chamber 29 thereby causing this liquid to be displaced downwardly through the orifice 32 and the openings 28 into the chamber 30. The withdrawal of the piston rod from the cylinder increases the liquid capacity of the cylinder, and to prevent the formation of a partial vacuum in the cylinder below the piston, additional liquid is supplied to the cylinder from the reservoir 18 through the restricted openings 34. Upon downward movement of the piston in the cylinder, liquid in the chamber 30 is forced upwardly through the openings 28 into the chamber above the piston. During this upward flow the liquid moves the valve element 25 away from the piston so that the liquid may flow freely around the outer edges of the valve element and into the upper chamber of the cylinder. The piston rod 21 entering the cylinder during the downward stroke of the piston displaces some of the liquid and this displacement action, combined with the compression stroke of the piston, causes liquid to be forced out of the cylinder and back into the reservoir 18 through the restricted openings 34. It should be noted at this point that the restricted openings 34 connect the working cylinder with the reservoir at a point below the surface of the liquid standing in the reservoir 18 so that there will be no occasion for air to be drawn into the cylinder through these restricted openings and cause an emulsion with the oil.

In shock absorbers of the hydraulic type considerable variation has heretofore been encountered in the functioning of these devices due to changes in the viscosity of the liquid consequent to temperature variations in the liquid. I have discovered that this undesirable variable action in a hydraulic shock absorber results from the character of the flow control means heretofore employed in these devices and that such an objectionable variable action can be avoided by minimizing or substantially eliminating the frictional resistance to the passage of the liquid through the flow control means. I have discovered further that the resistance to the passage of liquid through the flow control means of the hydraulic shock absorbing devices as heretofore constructed, is made up principally of two factors, namely, the resistance to flow represented by the restricted cross-sectional area of the opening or port, and the fluid friction in the passage connecting the liquid chambers. In my improved shock absorbing device, I have minimized or substantially eliminated the friction factor by eliminating a passage of substantial length and by employing, as the control port or orifice 32 which in this instance is located in the valve element 25, an orifice which, for convenience, may be referred to as a "thin plate orifice."

I have found it to be characteristic of shock absorbers of the hydraulic type that the resistance offered to the flow of the liquid is greatly dependent upon the fluid friction in the passage connecting the fluid chambers, and that the friction occurring in this passage is in turn dependent upon the viscosity of the liquid. Moreover, I have found that the flow of liquid through an orifice of the type which I employ, is determined largely by the cross-sectional area of the orifice and the pressure of the liquid, and is substantially independent of changes in the viscosity of the liquid. It will accordingly be seen that by eliminating a passage of substantial length through which the liquid must pass in being displaced from one chamber to another, the objectionable friction factor of the flow control means is rendered negligible and, since the flow of liquid through the orifice is substantially independent of the viscosity changes, a substantially constant shock absorbing action is attained which, for all practical purposes, is independent of temperature variations.

I embody the above described principle in the piston of my improved shock absorber, preferably by constructing the valve element 25 as a relatively thin disc or body of metal or other suitable material, such that the thickness of this disc, or at least of that portion of the disc which forms the side wall of the orifice, is always less than twice the diameter of the orifice 32. It is not necessary that the body, forming the valve element 25, be of uniform thickness throughout its extent, but it is important, from the standpoint of my invention, that that portion containing the orifice be made relatively thin so that the flow control passage will be very short. Thus, in constructing this valve element with a thickness, at the orifice, which is always less than twice the diameter of the orifice, it will be seen that the fluid passage provided by this orifice is of negligible length and the objectionable friction factor, referred to above, is not encountered during the passage of liquid from one chamber to the other through this orifice.

In the shock absorber, as herein illustrated, it is usually desirable that the control port or orifice be in the valve element of the piston, but it will be readily seen that the principle of my invention, as just explained, is applicable to this orifice regardless of whether the orifice is located in the valve portion, or in a piston member, such as the member 26, or in some other part. With further reference to the term "thin plate orifice", which appears in the specification and claims, it should be understood that I do not employ this term in its narrow literal sense, but use it in a broader sense in which it means an orifice or port providing a relatively short flow controlling passage, without limitation as to the cross-sectional shape or area of the passage, and without limitation as to the location of the passage, nor as to the size, shape, function or location of the part in which the passage is formed. It is usually desirable that the flow controlling orifice be a round opening, but I intend the term "thin plate orifice" to include orifices of any shape or contour which may be the effective equivalent of the round orifice 32.

It will be understood, of course, that the area of the orifice 32 is to be determined largely by the shock absorbing action desired during the upstroke of the piston and that the cross-sectional area of the openings 28 and 34 is to be determined largely by the shock absorbing action desired on the down stroke of the piston.

As another feature of my invention, I provide novel means for preventing leakage of liquid around the piston rod during the upstroke of the piston. This novel leakage preventing means comprises a packing 36 disposed around the piston rod 21, and a substantially cone-shaped resilient member 37 for pressing the packing against the piston rod. Any suitable form of stuffing-box may be provided to accommodate the packing 36 and the spring member 37 but, in this instance, this sealing means is accommodated in the recess formed between the inwardly dished outer end 38 of the plug member 14 and the outwardly dished wall 39 of a cap 40. The cap 40 may be retained on the outer end of the plug member, as by crimping the skirt portion of the cap into a recess 41 provided in the plug member.

The packing 36 may be of any suitable material but is preferably a body of cork having substantially the shape of a truncated cone. The resilient member 37 is preferably a metal disc, which is deflected during assembly to substantially the shape of a truncated cone as shown in Fig. 2, so that the tendency of this resilient member to return to flat disc shape causes the annular edge 42 of the packing to be pressed against the piston rod at all times. The pressing of this annular edge of the packing against the piston rod by the resilient member 37 results in liquid being scraped from the piston rod during its withdrawal from the cylinder, thereby producing a very efficient sealing action.

To prevent the pressure of the liquid in the chamber 28 from being transmitted to the packing 36, I provide the plug member 14 with an annular collecting chamber 43 which extends around the piston rod at a point inwardly of the packing recess. This collecting chamber is connected with the upper end of the reservoir 18 by means of a passage 44 so that liquid traveling upwardly around the piston rod may be returned to the reservoir without exerting pressure upon the packing 36. It will be noted also that the tendency for the cone-shaped resilient member 37 to move away from the dished end 38 of the plug member 14, provides an auxiliary collecting chamber 45 around the piston rod, in which the liquid scraped from the piston rod by the packing 36 may collect. Liquid collecting in this auxiliary chamber will drain downwardly into the collecting chamber 43 from whence it will return readily to the reservoir 18 through the passage 44. If desired, a proper fit and a smooth sliding action between the plug member 14 and the piston rod 21 may be had by providing a suitable bushing or sleeve 46, preferably of metal, between these members.

In some instances it may be desirable to provide a check valve in the passage 44, such as that shown in Fig. 5, to prevent liquid from being forced upwardly from the reservoir 18 into the chamber 43 during the downward stroke of the piston. This check valve may be of any suitable form and, as herein illustrated, may comprise a ball element 44' which is normally held seated by a light spring 45'. Upon the up stroke of the piston, the reduced pressure in the reservoir permits the ball element 44' to be readily opened by liquid in the collecting chamber 43, allowing such liquid to drain into the reservoir. During the down stroke of the piston, liquid passes into the reservoir through the opening 34, and if pressure is built up in the reservoir, such pressure holds the ball element 44' against its seat.

To shield the piston rod 21 from dust and other foreign material, and to prevent such substances from entering the device through the opening of the plug member 14, I employ a novel shield in the form of a tubular member 47 which telescopes around the housing 10 and which is movable with the piston rod. Connection between the piston rod and the shield may be conveniently made by providing the shield with a cap portion 48, through which the piston rod extends, and which may be welded to the connecting portion 23, as shown in Figs. 1 and 2. Entry of foreign material through the open lower end of the tubular shield may be prevented by providing a packing 49, of felt or other suitable material, around the plug member 14, which packing is permeable by air and has a wiping contact with the inner surface of the shield.

It will be noted that the dust shield 47, as shown in the drawings, is of such size relative to the reservoir sleeve 16 as to provide therebetween a space or passage of rather large cross-sectional area. This large cross-sectional area permits air to flow into or out of the dust shield at such a low velocity that there is very little tendency for dust or other foreign material to be carried into the shield. It will also be noted that the packing 49, when formed of felt or the like as mentioned above, readily permits air to pass therethrough into or out of the dust shield.

As explained above, the working cylinder 11 and the reservoir 18 of my shock absorbing device are charged with liquid and, as another feature of my invention, I provide novel means for charging or filling the cylinder and reservoir with such liquid. This novel filling means includes a filling opening 50 which is formed in the plug member 15 and arranged to communicate with the cylinder at the lower end thereof. A check valve 51, preferably of the ball type, controls the passage between the cylinder and the filling opening 50. When the device is to be charged with liquid the housing 10 is inverted from the position shown in Fig. 2, and the liquid is poured in through the opening 50. A desired amount of the liquid which enters the working cylinder 11 may be displaced into the reservoir 18 by moving the piston toward the plug member 15. This movement of the piston closes the check valve 51 and forces liquid into the reservoir through the openings 34. Upon movement of the piston in the opposite direction the check valve opens, allowing air to escape from the reservoir and cylinder so that additional liquid may be introduced through the filling opening 50. After the device has been charged with the desired amount of liquid the filling opening may be permanently closed by means of the plug 52.

If desired the charge of liquid may be replenished or renewed from time to time, without removal of the device from the vehicle, by the use of a pressure gun or similar tool. When the liquid supply is to be replenished, the closure plug 52 is removed and the liquid is forced in past the check valve 51 by the pressure gun. When the liquid supply is to be renewed, the check valve ball is unseated, as by extending a wire into the filling opening, and the liquid is drained from the device. The new charge of liquid is then forced in through the filling opening, as by a pressure gun.

During the refilling or replenishing of the shock absorber with liquid, as just explained, a measured amount of liquid is forced into the device and, in most instances, the air which is trapped and compressed in the upper end of the reservoir is not seriously objectionable because it gradually escapes to atmosphere through the passage 44 and past the packing 36. While such trapped air is in the compressed state in the reservoir, its presence is beneficial rather than harmful in that it aids the return flow of liquid from the reservoir to the working cylinder on the up-stroke of the piston and provides a cushioning effect on the downstroke of the piston.

Figure 8:
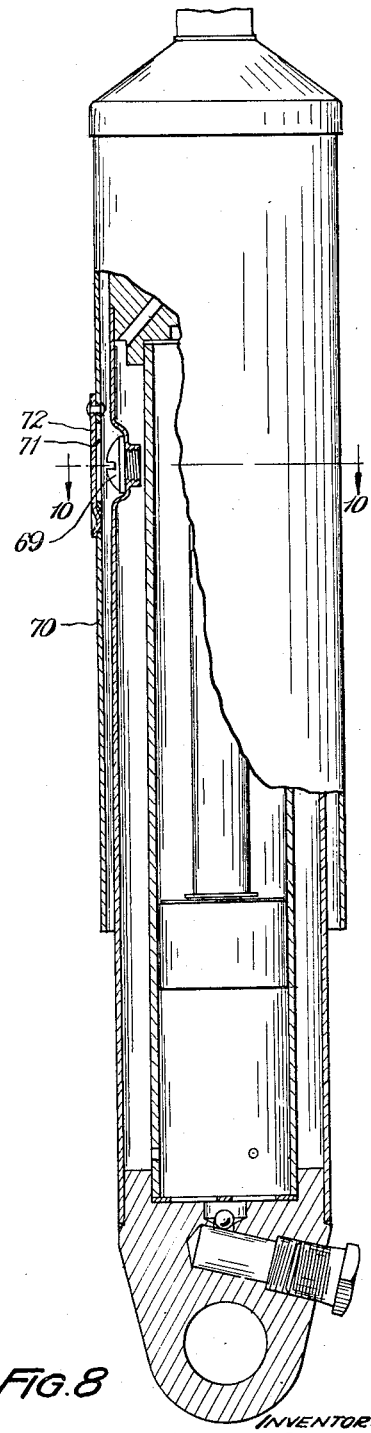
Fig. 8 is an elevational view, partly in section, showing another form of overflow opening for the reservoir.

In some instances this refilling or replenishing of the device may be facilitated by providing a suitable overflow opening communicating with the reservoir at a point adjacent the upper closure plug, as shown in Figs. 7 to 10 inclusive. In Fig. 7 the overflow opening is extended upwardly through the tube 65 and communicates with atmosphere through an opening 66 in the lower plug member 67 when the closure 68 is removed. In Fig. 8 the overflow opening extends through the side wall of the reservoir at the desired level and is closed by the screw 69. The dust shield 70 may have an opening 71 therein affording access to the screw 69 and which may be provided with a suitable cover 72. The overflow openings provided in the arrangements shown in Figs. 7 and 8 are normally closed by the members 68 and 69 and are opened only during replenishment or refilling.

In Fig. 6 of the drawings, I have shown a somewhat different construction which may be used instead of the plug member 15 shown in Figs. 1 and 2. In this alternative construction, I show a plug member 55 connected to a pair of coaxially arranged sleeves 56 and 57, at the lower end thereof. The sleeve 56 forms a working cylinder in which a piston, such as the piston shown in Fig. 2, is reciprocably operable. The sleeve 57 is spaced from the sleeve 56 to provide therebtween a reservoir 58 which communicates with the working cylinder through the restricted openings 59.

The plug member 55 is provided with a filling opening 60, which is connected to the working cylinder by a passage 61, such passage being controlled by a ball check valve element 62. The plug member is also provided with another passage 63 which connects the filling opening with the reservoir 58. Under certain conditions of operation I find that the provision of this passage, together with the check valve 62, materially increases the efficiency and utility of the device. For example, when the device is operating under certain conditions of temperature and the restricted openings 59 have been made small enough to afford the desired resistance to downward movement of the piston in the working cylinder, these openings may not permit the fluid to flow back from the reservoir into the working cylinder quickly enough for efficient operation. With the connecting passage 63, however, the partial vacuum created by the upstroke of the piston causes some of the liquid to flow into the opening 60 through the passage 63 and from the opening 60 up past the check ball 62 into the working cylinder. The down stroke of the piston closes the check valve 62 and the liquid being displaced into the reservoir by such down stroke, must pass through the restricted openings 59.

In the shock absorber arrangments herein disclosed, the upward stroke of the piston may be considered the high pressure stroke and the upper end of the cylinder may be conveniently referred to as the high pressure end. The downward stroke of the piston may be considered the low pressure stroke and the lower end of the cylinder may be conveniently referred to as the low pressure end.

From the foregoing description and the accompanying drawings, it should now be readily understood that I have provided an improved form of direct acting hydraulic shock absorber which is very efficient and reliable in operation. It will also be readily seen that by reason of the novel flow control means which I have provided, my improved device operates with a shock absorbing action which is practically constant and not subject to variation as the result of temperature changes. The efficient sealing means which I employ insures a correct amount of liquid being retained in the device and eliminates the need for frequent inspections and replacement of the working fluid. It will also be seen that the novel filling means which I employ facilitates the economic production of shock absorbers of this type and, likewise, it will be seen that the novel shield embodied in my improved device excludes foreign material and thereby prevents abrasion and the subsequent leakage, which would otherwise result from foreign material finding its way between the piston rod and the adjacent parts.

While I have illustrated and described the device of my invention in a detailed manner, it should be understood however, that I do not wish to be limited to the precise details of construction and arrangement of parts illustrated and described, but regard my invention as including such changes and modifications as do not involve a departure from the spirit of the invention and the scope of the appended claims.

Having thus described my invention, I claim:

1. In a shock absorber of the hydraulic type the combination of an elongated housing having therein a working cylinder and a reservoir adapted to contain a body of liquid, said housing having a filling opening at one end thereof communicating with both the reservoir and said cylinder, a gravity actuated check valve normally shutting off the cylinder from said filling opening, and a plug for closing said opening outwardly of said check valve.

2. In a shock absorber of the hydraulic type the combination of an elongated housing having therein a working cylinder adapted to contain a body of liquid, a piston operable in said cylinder, a rod extending into said cylinder for actuating said piston, a reservoir having restricted communication with said cylinder adjacent one end of the latter, said housing having a filling opening communicating with said cylinder substantially at said one end, and a check valve normally closing communication between the filling opening and cylinder.

3. In a shock absorber of the hydraulic type the combination of an elongated housing having therein a reservoir and a working cylinder adapted to contain a body of liquid, a piston operable in said cylinder, a rod extending into said cylinder and operably connected to said piston, closure means for the cylinder through which said rod extends, said closure means having a recess therein and a passage connecting said recess with said reservoir, and a check valve in said passage permitting a flow of liquid from said recess to said reservoir but not in the reverse direction.

4. In a shock absorber of the direct acting hydraulic type, the combination of a working cylinder, a reservoir having restricted communication with said cylinder, a piston operable in said cylinder and provided with flow controlling means whereby a flow of fluid past the piston is restricted to produce a shock absorbing action on movement of the piston in one direction and whereby fluid is forced into the reservoir through the restricted connection to produce a supplementary shock absorbing action, a by-pass for the restricted connection for returning fluid to the cylinder from the reservoir, and a check valve in the by-pass adapted to be opened only upon movement of the piston in said one direction.

5. In a shock absorber of the direct acting type, the combination of a cylinder, a reservoir, means providing a restricted connection between the cylinder and reservoir, a piston operable in said cylinder and provided with flow controlling means whereby a flow of fluid past the piston is restricted to produce a shock absorbing action upon movement of the piston in one direction and whereby fluid is forced into the reservoir through the restricted connection to produce a supplementary shock absorbing action, and means associated with said restricted connection providing for a relatively free return flow into the cylinder from the reservoir upon movement of the piston in the opposite direction.

6. In a shock absorber the combination of a cylinder, a reservoir, fluid in said cylinder and reservoir, a piston operable in said cylinder and having means providing for a relatively restricted flow of fluid past the piston on movement of the same toward one end of the cylinder and a relatively freer flow of fluid past the piston on movement of the same toward the other end of the cylinder, and means adjacent said other end of the cylinder providing for a relatively restricted flow of fluid from the cylinder into the reservoir upon movement of the piston toward said other end and a relatively freer flow of fluid from the reservoir into the cylinder upon movement of the piston toward said one end.

7. In a shock absorber the combination of a cylinder, a reservoir, fluid in said cylinder and reservoir, a piston operable in said cylinder and having means providing for a relatively restricted flow of fluid past the piston on movement of the same toward one end of the cylinder and a relatively freer flow of fluid past the piston on movement of the same toward the other end of the cylinder, and fluid transfer connecting means between said other end of the cylinder and the reservoir including a passage through which fluid is restrictedly discharged from the cylinder by the piston and by-pass valve means operable to permit a relatively unrestricted return flow of fluid into the cylinder from the reservoir.

8. In a shock absorber the combination of a cylinder having a high pressure end and a low pressure end, a reservoir, fluid in said cylinder and reservoir, a piston operable in said cylinder and having means providing for a relatively restricted flow of fluid past the piston upon movement of the same toward said high pressure end and a relatively freer flow of fluid past the piston upon movement of the same toward said low pressure end, a restricted connection between the low pressure end of the cylinder and said reservoir and through which fluid is restrictedly discharged from the cylinder upon movement of the piston toward said low pressure end, and check valve means operable between the cylinder and reservoir to permit a relatively free return flow of fluid into the cylinder upon movement of the piston toward the high pressure end.

9. In a shock absorber the combination of a cylinder having a high pressure end and a low pressure end, a reservoir having restricted communicating connection with said cylinder adjacent the low pressure end of the latter, fluid in said cylinder and reservoir, a piston operable in said cylinder between said high pressure end and said restricted connection and having means providing for a restricted flow of fluid past the piston on movement of the same toward said connection and a more restricted flow past the piston on movement of the same toward said high pressure end, and means for facilitating the return flow of fluid into the cylinder from the reservoir including a check valve adapted to be seated upon movement of the piston toward the restricted connection and to be opened upon movement of the piston toward the high pressure end.

10. In a shock absorber of the fluid flow type, the combination of a housing containing cylinder and reservoir chambers and having a head member providing a closure for said chambers, fluid in said cylinder and reservoir chambers, a piston in said cylinder adapted to cooperate with the fluid to produce a shock absorbing action, said head member having a filling opening comprising a recess therein one end of which is open to the exterior of the shock absorber and openings for connecting said recess respectively with said cylinder and reservoir chambers, a check valve for one of said openings and a closing plug for the outer, open end of the recess.

11. In a shock absorber, the combination of a housing including cylinder and reservoir barrels and a closure for one end of said barrels, fluid in said barrels, a piston in said cylinder barrel adapted to cooperate with said fluid to produce a shock absorbing action, said closure having a recess therein one end of which opens to the exterior of the shock absorber and having openings for connecting said recess respectively with the interior of said cylinder and reservoir barrels, a check valve controlling the opening connecting the recess and the cylinder barrel, and a removable plug closing the outer, open end of the recess.

12. In a shock absorber, the combination of an elongated housing including cylinder and reservoir barrels and a closure plug for the lower end of said barrels, fluid in said barrels, a piston in said cylinder barrel adapted to cooperate with said fluid to produce a shock absorbing action, said closure plug having a recess therein and openings for connecting said recess respectively with the interior of the cylinder barrel and with atmosphere, means removably closing the opening to atmosphere, and a check valve controlling the opening to the cylinder barrel.

13. A hydraulic shock absorber comprising, in combination, a cylinder; a reservoir; a piston in said cylinder; means comprising a filling opening and including a restriction, providing communication between the cylinder and reservoir, said means having an opening to the exterior of the shock absorber; a check valve normally closing the restricted portion of said means; and a removable plug closing the opening of said means.

14. A hydraulic shock absorber comprising, in combination, a reservoir; a cylinder; a piston in said cylinder; a head closing one end of said reservoir and cylinder, said head having a filling passage providing communication between the cylinder and head, the passage having a restricted throat portion and an end open to the exterior of the shock absorber; a check valve normally closing said restricted throat portion and permitting fluid to flow into the cylinder only; and a removable plug closing the outer open end of the head passage.

JOSEPH E. PADGETT.